US008972636B2

(12) United States Patent
Lin et al.

(10) Patent No.: US 8,972,636 B2
(45) Date of Patent: Mar. 3, 2015

(54) MEMORY INTERFACE CHIP CORRESPONDING TO DIFFERENT MEMORIES AND METHOD OF ESTABLISHING MEMORY TRANSMISSION CHANNEL

(75) Inventors: Chun-Fu Lin, Jhubei (TW); Chih-Kuo Sun, Jhubei (TW)

(73) Assignee: Alpha Imaging Technology Corp., Jhubei (TW)

( * ) Notice: Subject to any disclaimer, the term of this patent is extended or adjusted under 35 U.S.C. 154(b) by 124 days.

(21) Appl. No.: 13/313,412

(22) Filed: Dec. 7, 2011

(65) Prior Publication Data
US 2012/0144077 A1 Jun. 7, 2012

(30) Foreign Application Priority Data
Dec. 7, 2010 (TW) .............................. 099142680 A (51) Int. Cl.
*G06F 13/12* (2006.01)
(52) U.S. Cl.
CPC ...................................... *G06F 13/12* (2013.01)
USPC ............................................. 710/65; 710/306

(58) Field of Classification Search
USPC ............................................................. 710/65
See application file for complete search history.

(56) References Cited

U.S. PATENT DOCUMENTS

| | | | |
|---|---|---|---|
| 5,095,798 A * | 3/1992 | Okada et al. ..................... 463/35 |
| 6,839,788 B2 * | 1/2005 | Pecone ......................... 710/305 |
| 7,877,524 B1 * | 1/2011 | Annem et al. ................... 710/26 |
| 2006/0031620 A1 * | 2/2006 | Jakobs et al. ................. 710/305 |
| 2007/0262806 A1 * | 11/2007 | Thummalapally et al. ... 327/333 |
| 2008/0104282 A1 * | 5/2008 | Lee et al. .......................... 710/5 |

* cited by examiner

*Primary Examiner* — Henry Tsai
*Assistant Examiner* — John Roche
(74) *Attorney, Agent, or Firm* — Birch, Stewart, Kolasch & Birch, LLP (57) ABSTRACT

A memory interface chip is disclosed and includes a data output unit and a control module, wherein the data output module receives data from an external source. The data output unit can be selectively connected to different memory structures. The data output unit includes a first output channel and a second output channel, wherein the channels respectively generate a first output signal and a second output signal based on the data received. The control module selectively closes off the first output channel or the second output channel based on the memory architecture of the memory connected to the data output unit.

14 Claims, 9 Drawing Sheets

FIG. 7

MEMORY INTERFACE CHIP CORRESPONDING TO DIFFERENT MEMORIES AND METHOD OF ESTABLISHING MEMORY TRANSMISSION CHANNEL

1. FIELD OF THE INVENTION

This invention relates to a memory interface chip; specifically a memory interface chip for processing image data and corresponding to different memories structures.

2. DESCRIPTION OF THE PRIOR ART

In the field of data processing technology, the data processing module for processing electrical signals may use different memory structures for different purposes. For instance, while encoding/decoding image signals, the data processing module normally uses the Double-Data-Rate Two Synchronous Dynamic Random Access Memory (DDR2 SDRAM) to process image signals. On the other hand, while processing audio signals, the data processing module normally use Double-Data-Rate Synchronous Dynamic Random Access Memory (DDR SDRAM) to process audio signals.

Different memory structures and specifications have different data bus interface and interface voltages. Therefore, the data processing module using different types of memories normally includes a data transmission interface having several analogue front ends for processing digital data transmitted from different memories. However, the dimension of the data transmission interface of the data processing module can't be significantly reduced due to the use of many analogue front ends. Furthermore, above mentioned data transmission interface can use different electronic components and have different inner structures because of the difference in the memories' interface voltages.

Currently, DDR2 SDRAMs are now the main-stream memories used in the consumer electronic products and include DDR2 SDRAMs that use different interface voltages for the user to choose based on their needs.

DDR2 SDRAMs include DDR2 SDRAMs that are used to process interface voltages higher than the core voltage of the DDR2 SDRAMs and interface voltages lower than the core voltage, wherein the core voltage is conventionally 1.2 volts. However, the analogue front ends of DDR2 SDRAMs for processing different interface voltages use different components and therefore are not suitable for processing different interface voltages.

For instance, analogue front ends for processing normal interface voltages and low interface voltages are made of thick-oxide units and thin-oxide units, respectively. When the analogue front ends using thick-oxide units are used to process low interface voltages, the output bandwidth and overall data transmission rate of the thick-oxide units will be limited. On the other hand, when the analogue front ends made of thin-oxide units are used to process normal interface voltages, the higher interface voltages will damage the thin-oxide units of the analogue front ends and cause malfunction.

Thus, it can be seen that using memories with different bandwidths and interface voltages while maintaining the overall data transmission rate of the analogue front end is indeed an important issue in the data transmission technology.

SUMMARY OF THE INVENTION

It is an objective of the present invention to provide a memory interface chip corresponding to different memory structures and a method of establishing a data transmission channel for the corresponding system to use different memory structures.

It is another objective of the present invention to provide a memory interface chip and a method of establishing data transmission channel for receiving data from memories with different data transmission bandwidth.

It is yet another objective of the present invention to provide a memory interface chip and a method of receiving data from memories with different interface voltages.

The memory interface chip includes a data output unit and a control module, wherein the data output unit is selectively connected to a first memory or a second memory with different structures. The data output unit includes a first output channel and a second output channel, wherein the control module closes off the second output channel when the data output unit is connected to the first memory or closes off the first output channel when the data output unit is connected to the second memory.

The control module transmits signals to the data output unit via a first bus and a second bus. The control module also chooses the output channel based on the type of memory connected to the data output unit and the interface voltage used. The control module closes off the second output channel when a first interface voltage is generated by the data output unit. On the other hand, the control module closes off the first output channel when a second interface voltage is generated by the data output unit. This shows that the control module can choose the most appropriate output channel to process the interface voltage based on the interface voltage generated by the data output unit.

Furthermore, the memory interface chip of the present invention further includes a data receiving unit for receiving data signal from the first memory or the second memory. The data receiving unit includes a first receiving channel and a second receiving channel, wherein the data receiving unit closes off the second receiving channel when the data output unit is connected to the first memory or closes off the first receiving channel when the data output unit is connected to the second memory.

Similar to the data output unit, the control module can choose the receiving channel based on the voltage generated by the data receiving unit. The control module closes off the second receiving channel when receiving the first interface voltage and closes off the first receiving channel when receiving the second interface voltage. This shows that the control module chooses the most appropriate receiving channel to process the interface voltage based on the level of the interface voltage.

DETAILED DESCRIPTION OF THE PREFERRED EMBODIMENT

The present invention relates to a memory interface chip and preferably a memory interface chip for processing image data and corresponding to different memory structures. The memory interface chip is connected to a digital signal source to receive and process the digital data signal and then transmit the processed digital data signal to a data processing system such as digital cameras or personal computers. The memory interface chip includes a plurality of output channels corresponding to different memory structures and memories using different interface voltages such as Double Data Rate Synchronous Dynamic Random Access Memory (DDR SDRAM) and Double Data Rate Two Synchronous Dynamic Random Access Memory (DDR2 SDRAM). The memory interface chip can selectively close off at least one of the output channels based on the structure or interface voltage of the memory used.

Figure 1A:
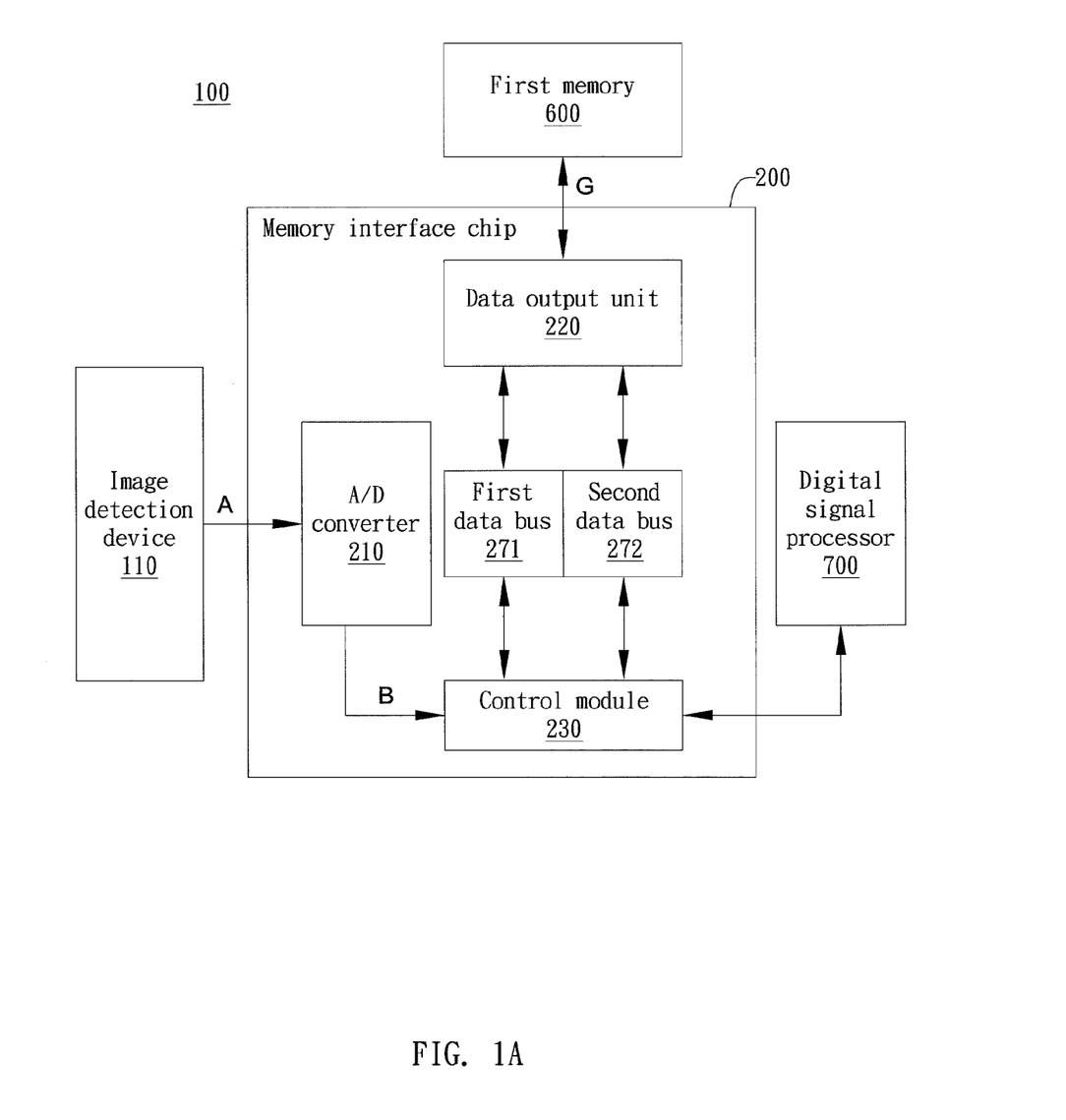
FIG. 1A is a block diagram of an image processing device including the memory interface chip of the present invention.

FIG. 1A is a block diagram of an image processing device 100. As FIG. 1A shows, the image processing device 100 includes an image detection device 110, the memory interface chip 200 of the present invention, a first memory 600, and a digital signal processor 700. In the present embodiment, the image detection device 110 preferably includes a lens (not illustrated) used to accept light from images and generates a plurality of analogue image signals A based on the light received, wherein the analogue image signals A represent the luminance and chroma of images received by the lens. The image detection device 110 is a Complementary Metal-Oxide-Semiconductor (CMOS) image sensor, but is not limited thereto; in different embodiments, the image detection device 110 also includes Charged-Coupled Device (CCD) Image Sensor or other photoelectric devices that generates analogue signals based on the images received.

As FIG. 1A shows, the memory interface chip 200 is connected to the image detection device 110 to receive the analogue image signal A. The memory interface chip 200 of the present embodiment preferably includes an analogue-to-digital converter 210, a data output unit 220, and a control module 230. The analogue-to-digital converter 210 converts the analogue image signal A generated by the image detection device 110 to a digital image signal B. The digital image signal B is then transmitted to the control device 230 and written into the first memory 600.

In the embodiment illustrated in FIG. 1A, the memory interface chip 200 further includes a first data bus 271 and a second data bus 272, wherein the first data bus 271 and the second data bus 272 are 16-bit data interfaces. In other words, the first data bus 271 and the second data bus 272 are interfaces that have 16 pins.

In the embodiment illustrated in FIG. 1A, the first memory 600 is a DDR2 SDRAM and therefore each pin of the first data bus 271 and the first memory 600 transmit data at a 400 MHz clock rate. In this way, the first data bus 271 will perform data access with the first memory 600 at 1.6 GByte/s. In other words, the data transmission rate of each pin of the first data bus 271 is approximately 800 Mbits/s.

Furthermore, the second data bus 272 of the present embodiment is used to transmit the memory address of the first memory 600, wherein the data transmission rate of the second data bus 272 can be lower than that of the first data bus 271.

In a more preferred embodiment, when the first memory 600 is a DDR SDRAM, the first data bus 271 and the second data bus 272 are both used for data transmission with the first memory 600. Here the first data bus 271, the second data bus 272, and the first memory 600 transmits data at a 400 MHz clock rate. In this way, the first data bus 271 and the second data bus 272 will perform data access with the first memory 600 also at 1.6 GByte/s. In other words, the data transmission rate of each pin of the first data bus 271 and the second data bus 272 is 400 Mbits/s.

The control module 230 will transmit the digital image signal B to the digital signal processor 700 for further signal processing. The control module 230 then transmits the data generated by the digital signal processor 700 to the data output unit 220 via the first data bus 271 and the second data bus 272, wherein the data output unit 220 accesses the first memory 600 after adjusting its output voltage. In the embodiment illustrated in FIG. 1A, the first memory 600 is a DDR2 SDRAM with a interface voltage of 1.8 volts, but is not limited thereto; in different embodiments, the first memory 600 can be a DDR SDRAM with a interface voltage of 2.5 volts.

In the embodiment illustrated in FIG. 1A, the memory interface chip 200 of the present invention is preferably used in the image processing devices 100 such as digital cameras to process digital signals transmitted between the digital signal processor 700 and different types of memories, but is not limited thereto; in different embodiments, the memory interface chip 200 of the present invention can also be used in personal computers, mobile phones or other electronic devices that use different types of memories.

Figure 1B:
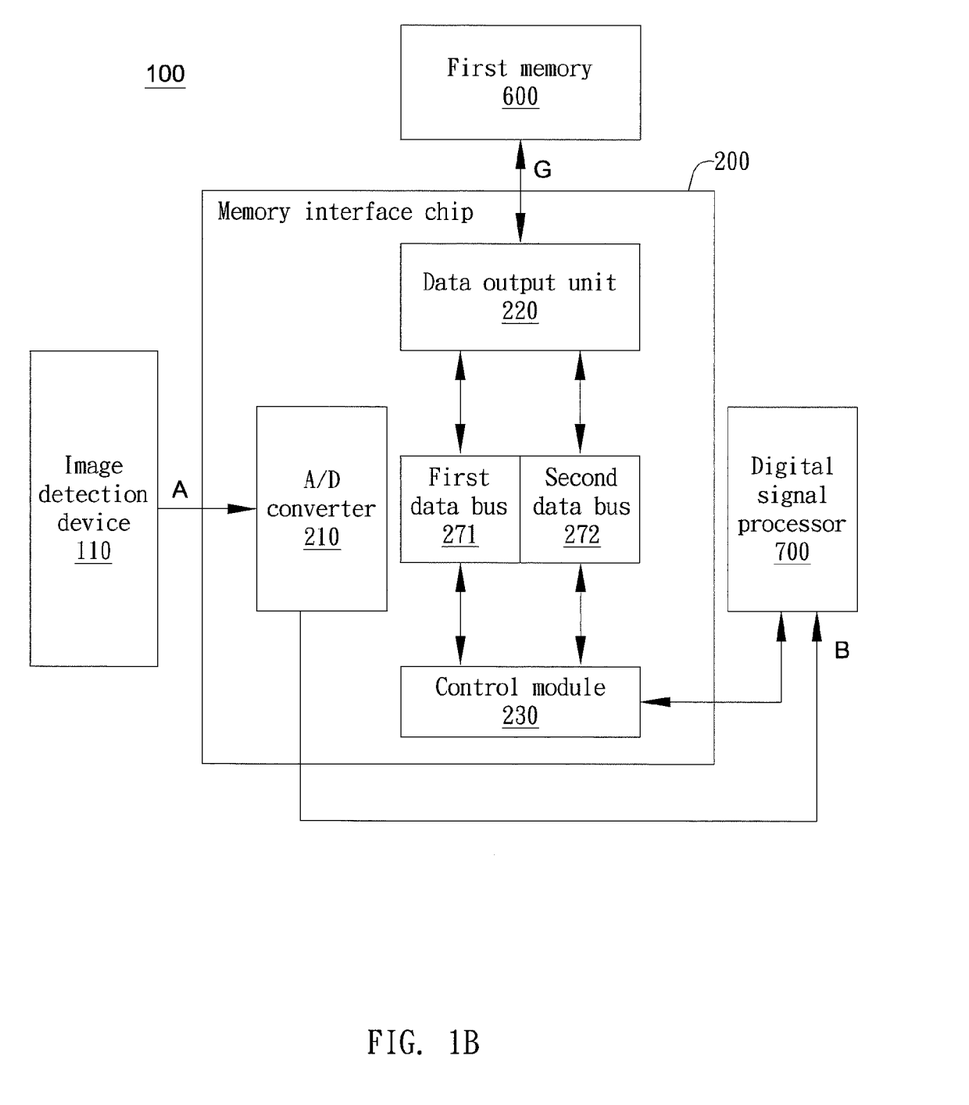
FIG. 1B is a block diagram illustrating a variation of the image processing device illustrated in FIG. 1A.

Furthermore, in the embodiment illustrated in FIG. 1A, the control module 230 is the data transmission centre between the image detection device 110, the first memory 600, the digital signal processor 700, and other modules of the memory interface chip 200, but is not limited thereto. In the embodiment illustrated in FIG. 1B, the analogue-to-digital converter 210 can be directly connected to the digital signal processor 700 to transmit the digital image signal B directly to the digital signal processor 700 for further processing.

Figure 2:
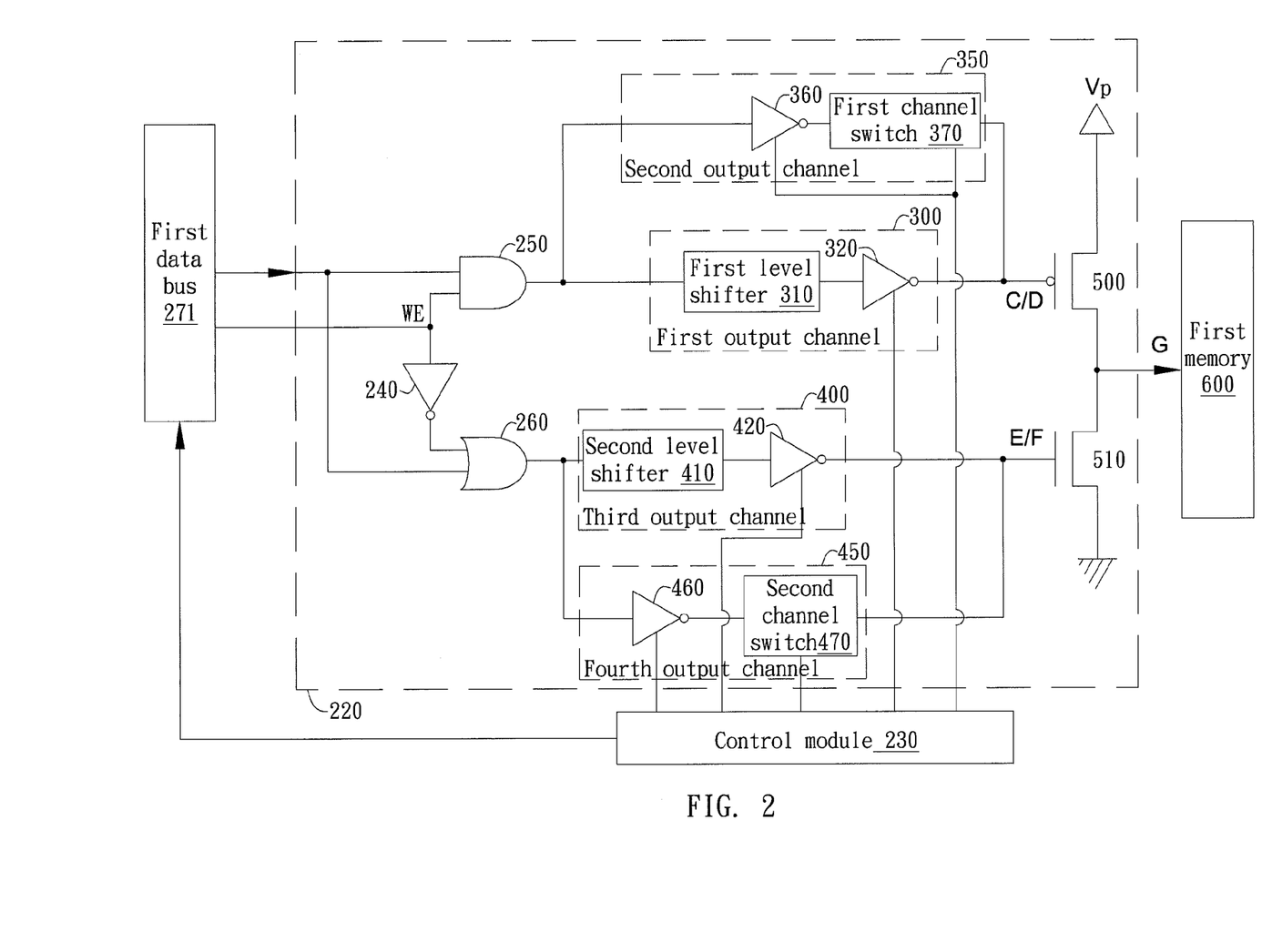
FIG. 2 is a schematic view of the data output unit illustrated in FIG. 1A.

FIG. 2 is a schematic view of the data output unit 220 illustrated in FIG. 1A. As FIG. 2 shows, the data output unit 220 preferably includes an inverter 240, an AND gate 250, a OR gate 260, a first output channel 300, a second output channel 350, a third output channel 400, a fourth output channel 450, a first post-driver 500, and a second post-driver 510.

Furthermore, in the embodiment illustrated in FIG. 2, one of the input terminals of the AND gate 250 accepts an enable signal WE from the first data bus 271 controlled by the control module 230. The input terminal of the inverter 240 receives the enable signal WE and generates an inverted version of the enable signal WE. One of the input terminals of the OR gate 260 accepts the inverted version of the enable signal WE.

As FIG. 2 shows, the first post-driver 500 is preferably a p-channel metal-oxide-semiconductor field-effect transistor (PMOS), wherein the source of the first post-driver 500 is connected to voltage source Vp. Furthermore, the gate of the first post-driver 500 is electrically connected to the first output channel 300 and the second output channel 350, wherein the first post-driver 500 selectively conducts or closes off based on the output signal of the first output channel 300 and the second output channel 350.

On the other hand, the second post-driver 510 is preferably N-channel metal-oxide-semiconductor field-effect transistor (NMOS), wherein the source of the second post-driver 510 is electrically connected to a ground. Furthermore, the gate of the second post-driver 510 is electrically connected to the third output channel 400 or the fourth output channel 450, wherein the second post-driver 510 is selectively on or off based on the output signals of the third output channel 400 or the fourth output channel 450. In addition, the output terminal of the data output unit 220 is located at the connection between the drain of the first post-driver 500 and the drain of the second post-driver 510.

As FIG. 2 shows, the first output channel 300 includes a first level shifter 310 and a first pre-driver 320. The AND gate 250 transmits a Logically high signal or a logically low signal to the first level shifter 310 based on the voltage at its input terminal. The first level shifter 310 will boost the voltage of the logically high signal and then transmits the logically high signal to the first pre-driver 320. The first pre-driver 320 then transmits a first data signal C to the first post-driver 500, wherein the voltage level of the first data signal C and the output signal of the AND gate 250 have different voltage levels.

Furthermore, the first pre-driver 320 is electrically connected to the control module 230, wherein the control module 230 forces the first pre-driver 320 into conduction or into a high output impedance state, based on the structure or interface voltage of the memory connected to the memory interface chip 200. In other words, the control module 230 can force the first output channel 300 to conduct or close off the first output channel 300 based on the structure or interface voltage of the memory, but is not limited thereto. In different embodiments, after connected to the first memory 600, the memory interface chip 200 can keep the first pre-driver 320 at conduction using the firmware of the data output unit 220.

As FIG. 2 shows, the second output channel 350 of the present embodiment includes a second pre-driver 360 and a first channel switch 370. The AND gate 250 transmits a logically high signal or a logically low signal to the second pre-driver 360 based on the voltage at its input terminal. The second pre-driver 360 then outputs a second data signal D, which is an inverted version of the output signal generated by the AND gate 250, to the first post-driver 500 via the first channel switch 370.

Furthermore, the second pre-driver 360 and the first channel switch 370 are connected to the control module 230. The control module 230 forces the second pre-driver 360 into conduction or a high output impedance state based on the structure or interface voltage of the memory connected to the memory interface chip 200, but is not limited thereto; in different embodiments, after connected to the first memory 600, the memory interface chip 200 can keep the second pre-driver 360 at the high output impedance state using the firmware of the data output unit 220.

In the embodiment illustrated in FIG. 2, the first data bus 271 transmits data to the AND gate 250 and the OR gate 260, wherein the control module 230 forces the second pre-driver 360 into the high output impedance state and closes off the first channel switch 370. In other words, the control module 230 will close off the data transmission through the second output channel 350.

In the present embodiment, the second pre-driver 360 uses thin-oxide layer transistors that are not tolerant to voltages higher than 1.2 volts (core voltage), wherein voltages higher than the core voltage of 1.2 volts can produce overstress on pre-driver 360 and damage its structure. In this way, the control module 230 can disable the components of the second output channel 350 in order to prevent those components from damages which would influence the operation of the memory interface chip 200. The second pre-driver 360 can also use transistors made of materials for processing signals below 1.2 volts.

Here please refer to the third output channel 400 and the fourth output channel 450 illustrated in FIG. 2. The third output channel 400 includes a second level shifter 410 and a third pre-driver 420. The OR gate 260 will transmit a logically high signal or a logically low signal to the second level shifter 410 based on the voltage at its input terminal, wherein the second level shifter 410 will boost the voltage of the signal received and then transmit it to the third pre-driver 420. The third pre-driver 420 then outputs a third data signal E to the second post-driver 510, wherein the third data signal E and output voltage of the AND gate 250 have different polarities.

The third pre-driver 420 illustrated in FIG. 2 is electrically connected to the control module 230, wherein the control module 230 forces the third pre-driver 420 into conduction or high output impedance state based on the output interface voltage of the memory connected to the memory interface chip 200. In other words, the control module 230 can selectively conduct or close off the third output channel 400 based on the output interface voltage of the memory or other criterions, but is not limited thereto. In different embodiments, when connected to the first memory 600, the memory interface chip 200 can use the firmware stored in the data output unit 220 to directly keep the third pre-driver 420 in a conduction state.

As FIG. 2 shows, the fourth output channel 450 includes a fourth pre-driver 460 and a second channel switch 470. The OR gate 260 will selectively transmit a logically high signal or a logically low signal to the fourth pre-driver 460 based on the voltage at the input terminal of the OR gate 260. When the second channel switch 470 is switched on and conducting, the fourth pre-driver 460 can transmit a fourth data signal F to the second post-driver 510 via the second channel switch 470, wherein the fourth data signal F and the output voltage of the OR gate 260 have different polarities.

The fourth pre-driver 460 and the second channel switch 470 are both connected to the control module 230, wherein the control module 230 can force the fourth pre-driver 460 into conduction or a high output impedance state based on the output interface voltage of the memory connected to the memory interface chip 200. On the other hand, the control module 230 selectively switches the second channel switch 470 on or off according to the output interface voltage of the memory connected to the memory interface chip 200 or other criterions. In other words, the control module 230 can selectively make the fourth output channel conducting or closed off based on the structure or output interface voltage of the memory connected to the memory interface chip 200, but is not limited thereto. In different embodiments, when connected to the first memory 600, the memory interface chip 200 can use the firmware stored in the data output unit 220 to directly keep the fourth pre-driver 460 at a high output impedance state.

In the embodiment illustrated in FIG. 2, the transistors used in the fourth pre-driver 460 are thin-oxide layer transistors that are less tolerant to high voltages and can be damaged by voltages higher than 1.2 volts. Therefore, the control module 230 closes off the second channel switch 470 when the first interface voltage G is higher than 1.2 volts, in order to prevent the fourth pre-driver 460 from damages caused by voltages higher than 1.2 volts and maintain the overall operation of the memory interface chip 200.

The first memory 600 of the present embodiment is a DDR2 SDRAM with a 1.8 volt output interface voltage. Therefore, the control module 230 closes off the second output channel 350 and the fourth output channel 450 after the level of interface voltage of the first memory 600 is confirmed. In this way, the first post-driver 500 and the second post-driver 510 receive signals from the conducting first output channel 300 and the third output channel 400 respectively and selectively conduct or close off. The output terminal of the data output unit 220 is located at the connection between the drain of the first post-driver 500 and the drain of the second post-driver 510. Therefore, output signal of the first data bus 271 is logically high (also called 1), the voltage at the output terminal of the data output unit 220 is also logically high. On the other hand, when the output signal of the first data bus 271 is logically low (also called 0), the voltage at the output terminal of the data output unit 220 is also logically low or close to that of ground.

Figure 3:
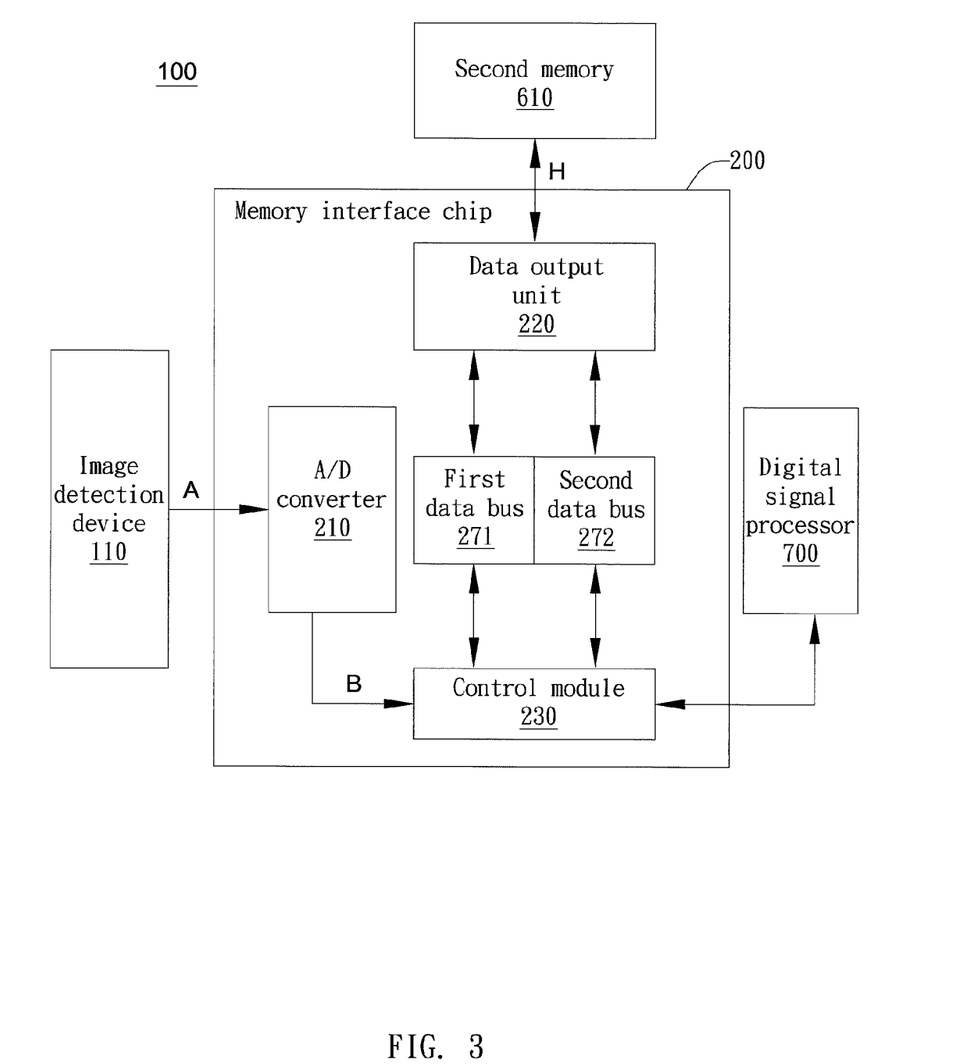
FIG. 3 is a block diagram illustrating another variation of the image processing device illustrated in FIG. 1A, wherein the image processing device uses a second memory generating a second interface voltage.

FIG. 3 is a variation of the image processing device 100 illustrated in FIG. 1A. As FIG. 3 shows, the image processing device 100 of the present embodiment replaces the first memory 600 illustrated in FIG. 1A with a second memory 610 outputting a second interface voltage H. Furthermore, the second memory 610 mentioned above is preferably a DDR2 SDRAM outputting a second interface voltage H of 1.2 volts, but is not limited thereto; in different embodiments, the second memory 610 also includes other electronic data memory with second interface voltages greater than 1.8 volts.

Figure 4:
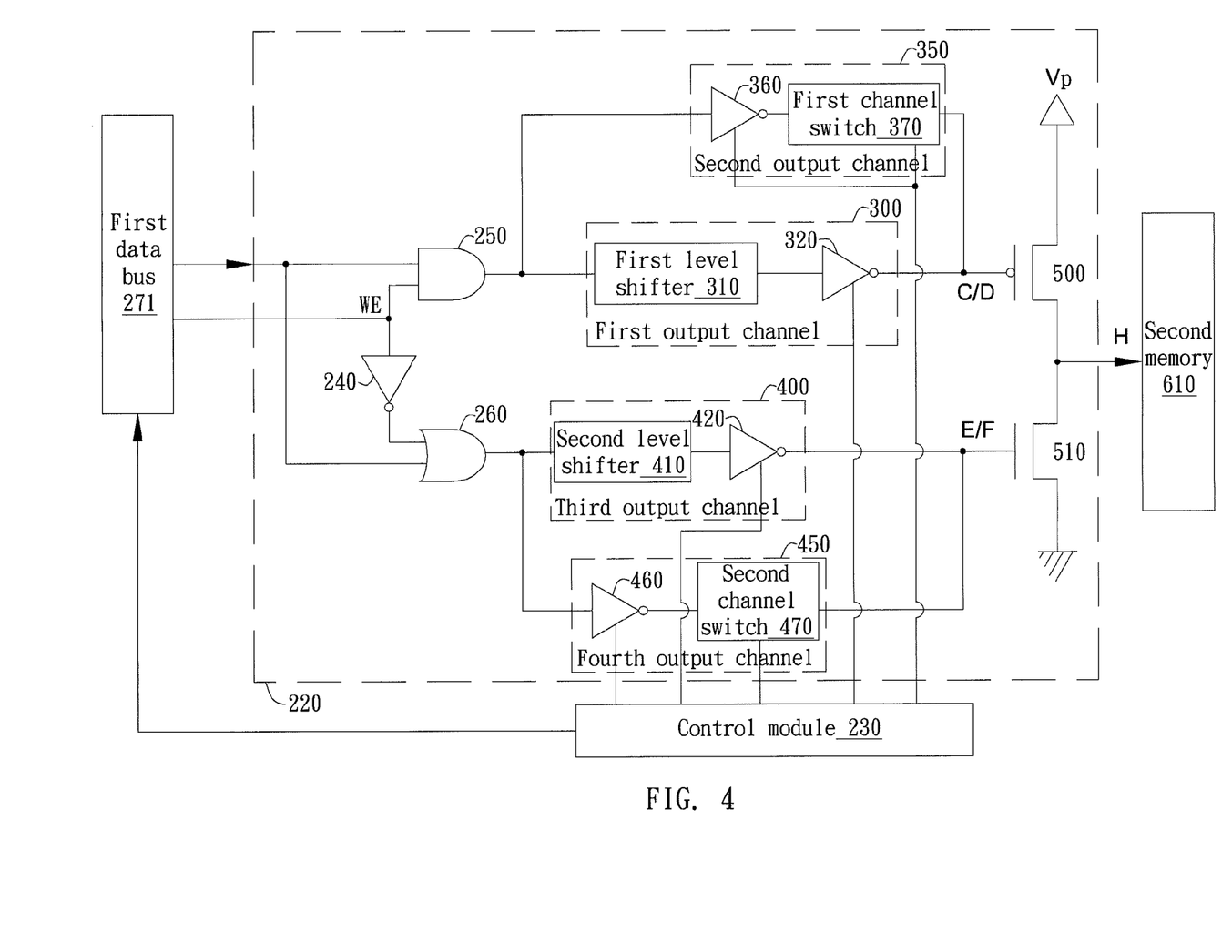
FIG. 4 is schematic view of the data output unit of the memory interface chip illustrated in FIG. 3.

FIG. 4 is a schematic view of the data output unit 220 of the memory interface chip 200 illustrated in FIG. 3. The data output unit 220 illustrated in FIG. 2 and FIG. 4 are substantially the same and thus the structure and the elements of the data output unit 220 are not further elaborated. However, the data output unit 220 of the present embodiment transmits a 1.2 volt second interface voltage to the second memory 610, wherein the transistors used in the first output channel 300 and the third output channel 400 are made of thick-oxide layers. Therefore, the 1.2 volt second interface voltage H is not enough to drive the components in the first output channel 300 and the third output channel 400 and this create substantial limit on the output bandwidth of those two output channels 300, 400. However, in different embodiments, the components in the first output channel 300 and the third output channel 400 are preferably made of material capable of processing electrical signals greater than 1.2 volts.

The control module 230 illustrated in FIG. 4 will force the second pre-driver 360 of the second output channel 350 and the first channel switch 370 to enter a conduction state to process 1.2 volt electrical signals. The control module 230 will also force the fourth pre-driver 460 of the fourth output channel 450 and the second channel switch 470 to enter the conduction state to process 1.2 volt electrical signals.

In this way, when the output voltages of the first data bus 271 is logically high (also called 1), the voltage at the output terminal of the data output unit 220 is also logically higher or substantially equal to the voltage source Vp. On the other hand, when the output voltages of the first data bus 271 is logically low (also called 0), the voltage at the output terminal of the data output unit 220 is also logically low or substantially equal to ground.

In the embodiments illustrated from FIG. 1A to FIG. 4, the control module 230 includes both a first driver and a second driver used as references for driving the first memory 600 and the second memory 610, respectively. In the embodiments illustrated in FIG. 1A to FIG. 4, when the memory interface chip 200 is connected to the first memory 600 or detects that the output interface voltage of the memory is greater than 1.2 volts, the control module 230 will use the first driver to force the first output channel 300 and the third output channel 400 to conduct and process electrical signals greater than 1.2 volts. As mentioned above, in different embodiments of the present invention, the memory interface chip 200 can also use the firmware stored in the data output unit 220 to force the first output channel 300 and the third output channel 400 into conduction and force the second output channel 350 and the fourth output channel 450 to enter a high output impedance state.

On the other hand, when the memory interface chip 200 is connected to the second memory 610 or detects that the output interface voltage of the memory is smaller than 1.2 volts, the control module 230 will use the second driver to force the second output channel 350 and the fourth output channel 450 to conduct and process electrical signals smaller than 1.2 volts.

Furthermore, in the embodiments illustrated in FIG. 1A to FIG. 4, the control module 230 uses 1.2 volts as a reference for controlling the output channels 300, 350, 400, 450 of the data output unit 220, but is not limited thereto; in different embodiments, the control module 230 can also use 1.8 volts or other suitable voltage levels as a reference for controlling the output channels 300, 350, 400, 450 of the data output unit 220.

In the embodiments mentioned above, the first memory 600 is the DDR2 SDRAM whose data transmission rate and operating frequency are both greater than those of the second memory 610. In other words, the data transmission rate and operating frequency of the first memory 600 are both greater than those of the second memory 610, but is not limited thereto; in different embodiments, the first memory 600 can have transmission rate and operating frequency that are smaller than those of the second memory 610 due to different structure or different specification.

Furthermore, in the embodiments mentioned above, the control module 230 selectively closes off the first output channel 300 and the third output channel 400 or closes off the second output channel 350 and the fourth output channel 450, but is not limited thereto; in different embodiments, the control module 230 can use the data transmission rate or operating bandwidth of the memory as reference to control the output channels 300, 350, 400, 450.

Figure 5A:
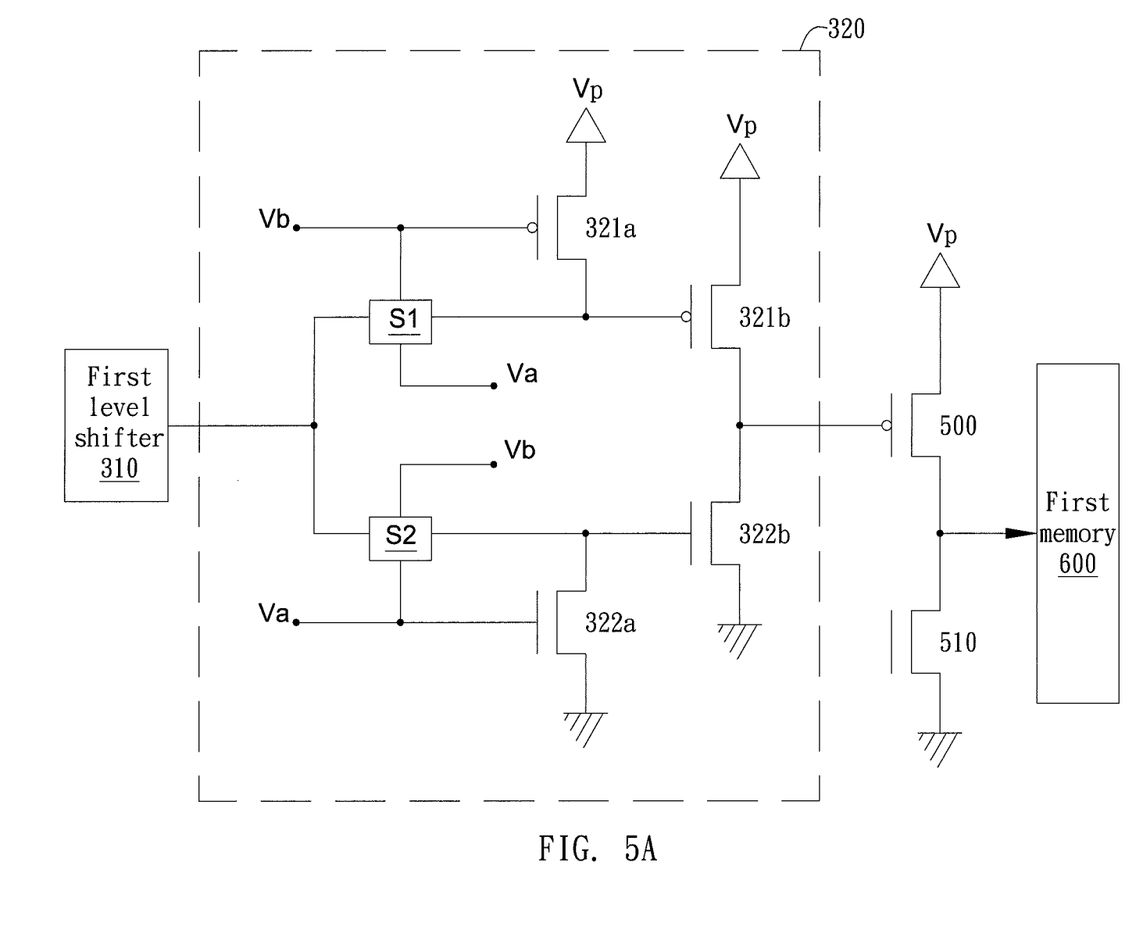
FIG. 5A and FIG. 5B are schematic views of the first pre-driver and the second pre-driver of the memory interface chip respectively.

FIG. 5A is a circuit diagram of the first pre-driver 320 illustrated in FIG. 2. The first pre-driver 320 includes a thick-oxide PMOS transistors 322a, 322b, thick-oxide NMOS transistors 362a, 362b, and switches S1, S2, wherein the switches S1, S2 of the present embodiment are preferably thick-oxide complementary CMOS switches.

The switches S1, S2 receives electrical signals from the control module 230 illustrated in FIG. 2. In addition, the control module 230 outputs a first control signal Va and a second control signal Vb to the thick-oxide PMOS transistors 322a, 322b, thick-oxide NMOS transistors 362a, 362b, and switches S1, S2, wherein the first control signal Va and the second control signal Vb have different polarities. In the present embodiment, when the signal received by the first pre-driver 320 is logically low, the output signal of the first pre-driver 320 is logically high. On the other hand, when the signal received by the first pre-driver 320 is logically high, the output signal of the first pre-driver 320 is logically low.

The internal circuit and the operation of the third pre-driver 420 illustrated in FIG. 2 are substantially identical to the first pre-driver 320 illustrated in FIG. 5A and therefore are not further elaborated here. Furthermore, in different embodiments, the first pre-driver 320 and the third pre-driver 420 can use different electronic components or have other structures in order to process voltages higher than 1.2 volts.

Figure 5B:
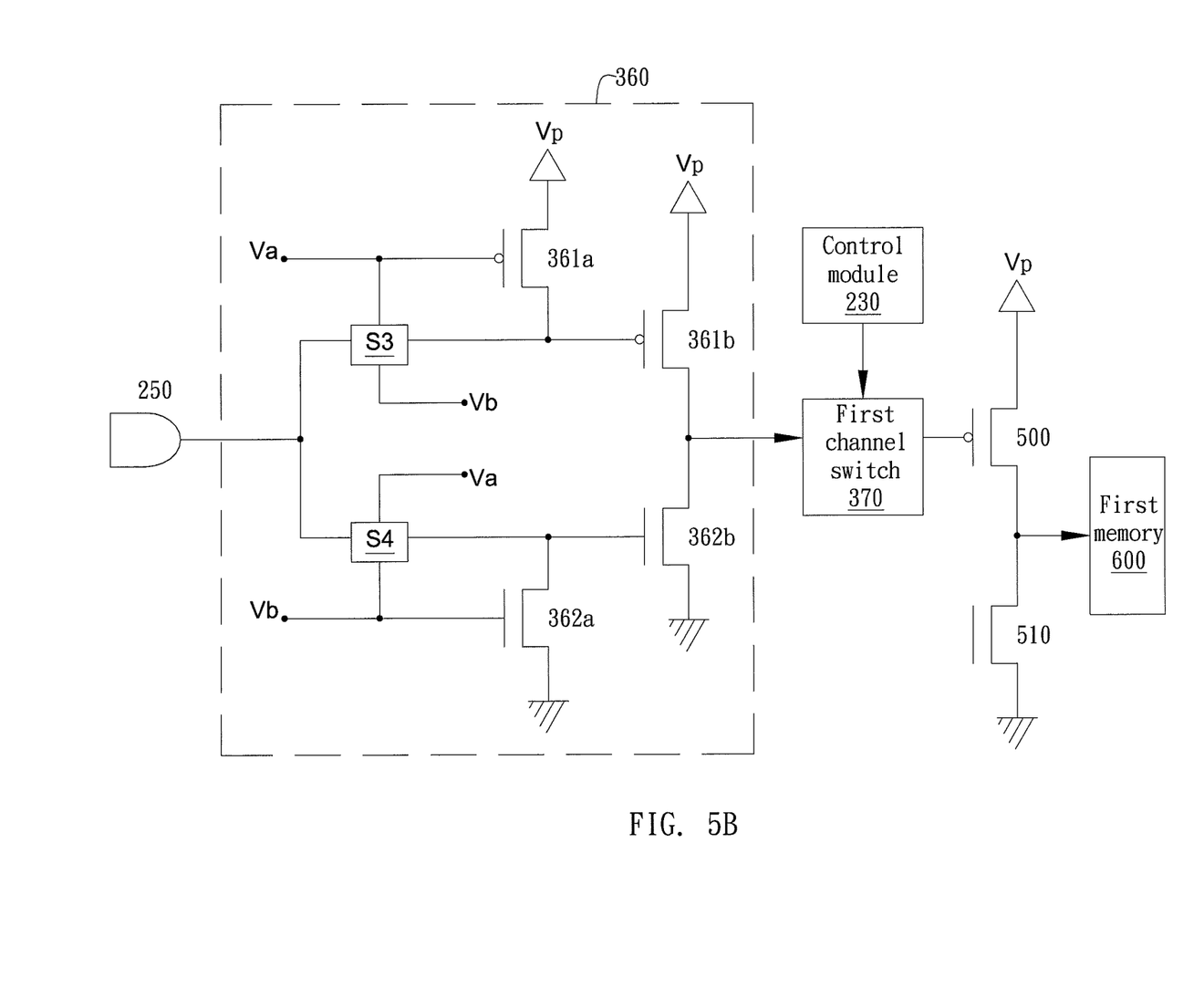

On the other hand, FIG. 5B is a schematic view of the internal circuit of the second pre-driver 360 illustrated in FIG. 2. As FIG. 5B shows, the second pre-driver 360 includes thin-oxide PMOS transistors 361a, 361b, thin-oxide NMOS transistors 362a, 262b, and switches S3, S4, wherein the switches S3, S4 are preferably thin-oxide complementary CMOS switches. The control module 230 outputs a first control signal Va and a second control signal Vb to the thin-oxide PMOS transistors 361a, 361b, thin-oxide NMOS transistors 362a, 362b, and switches S3, S4, wherein the first control signal Va and the second control signal Vb have different polarities. In this way, when the signal received by the second pre-driver 360 is logically low, the output signal of the second pre-driver 360 will be logically high. On the other hand, when the signal received by the second pre-driver 360 is logically high, the output signal of the second pre-driver 360 will be logically low.

The internal circuit and the operation of the fourth pre-driver 460 are substantially identical to the second pre-driver 460 and therefore are not elaborated here. Furthermore, in different embodiments, the second pre-driver 360 and the fourth pre-driver 460 can use different electronic components or have other structures in order to process voltages lower than 1.2 volts.

Figure 6:
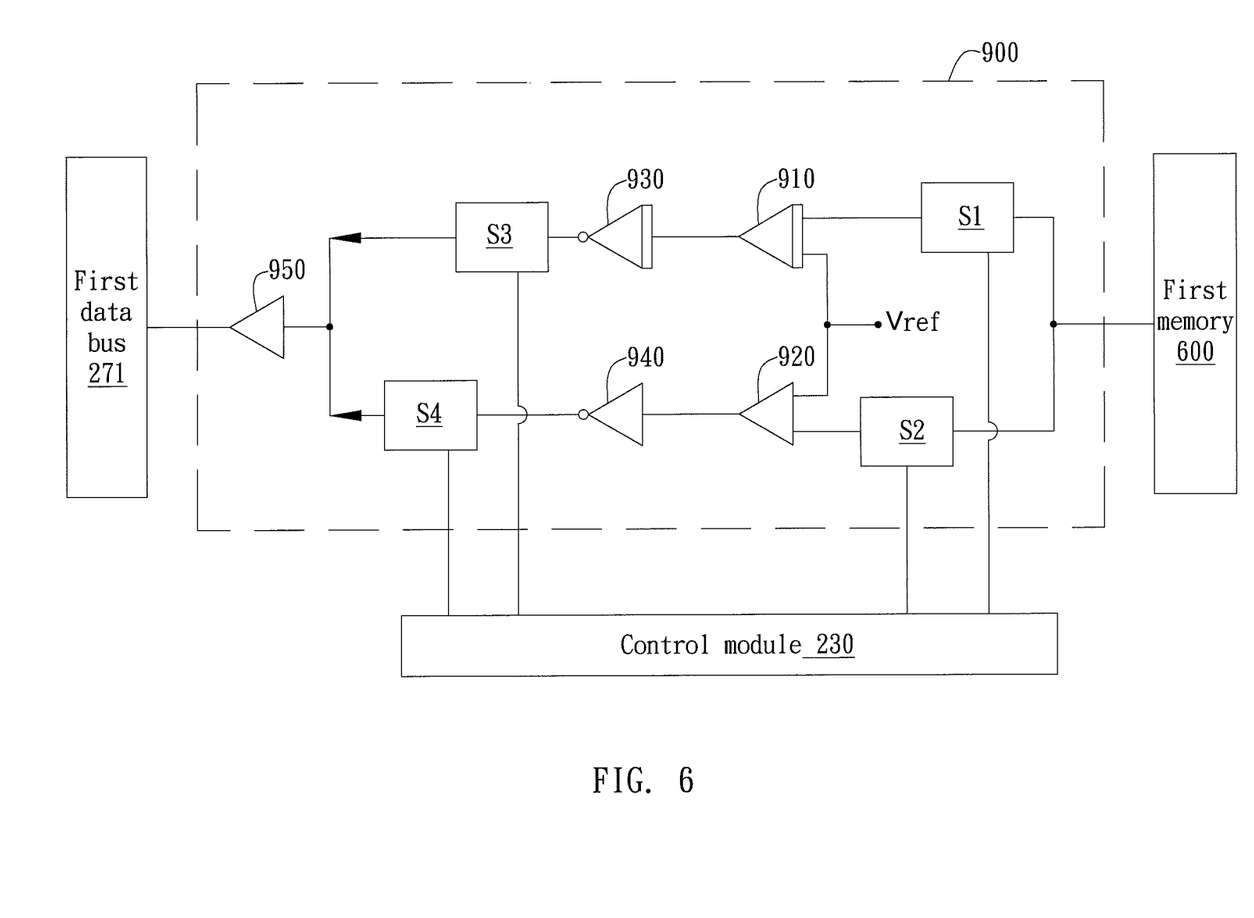
FIG. 6 is a schematic view of the data receiving unit of the present invention.

The memory interface chip 200 further includes a data receiving unit 900, wherein FIG. 6 is a schematic diagram of the data receiving unit 900. The data receiving unit 900 includes switches S1, S2, S3, S4, a first comparator 910, a second comparator 920, a first inverter 930, a second inverter 940, and a buffer 950. As FIG. 6 shows, the non-inverting input terminals of the first comparator 910 and the second comparator 920 are kept logically high by a reference voltage source Vref. In this way, the operation of the first comparator 910 and the second comparator 920 are approximately equivalent to the differential comparator on the market and therefore is not elaborated here.

Furthermore, the first comparator 910 and the second comparator 920 of the present embodiment are made of thick-oxide material and thin-oxide material, respectively. In this way, the first comparator 910 is more suitable for processing electrical signals higher than 1.2 volts while the second comparator 920 is more suitable for processing electrical signals below 1.2 volts.

In the embodiment illustrated in FIG. 6, the switches S1, S2, S3, S4 are all connected to the control module 230 and selectively conduct or close off according to the command of the control module 230. When the data receiving unit 900 of the present embodiment is connected to the first memory 600 and receives digital data higher than 1.2 volts, the control module 230 conducts the switches S1, S3 and closes off the switches S2, S4 for transmission purposes. In this way, the digital data from the first memory 600 pass through the switches S1, S3, the first comparator 910, the first inverter 930, the buffer 950, the first data bus 271 (or the second data bus 272) and is then received by the wherein the digital data is then received by the digital signal processor 700 for further processing.

On the other hand, when the data receiving unit 900 of the present embodiment is connected to the second memory 610 illustrated in FIG. 3 and receives digital data lower than 1.2 volts, the control module 230 will conduct the switches S2, S4 and closes off the switches S1, S3 for transmission purposes. In this way, the low-voltage digital data from the second memory 610 pass through the switches S2, S4, the second comparator 920, the second inverter 940 and is then stored temporarily in the buffer 950. The low-voltage digital data then pass through the first data bus 271 (or the second data bus 272) to be received by the digital signal processor 700.

Thus it can be seen that the control module 230 illustrated in FIG. 6 can select the most suitable channel based on the level of interface voltage of the second memory 600 and turns off other channels. In this way, the control module 230 can protect the data receiving unit 900 and ensure the desired signal transmission rate. However, in other embodiments, the memory interface chip 200 connected to the first memory 600 can use the firmware stored in the data output unit 220 to keep the switches S1, S3 conducted.

Figure 7:
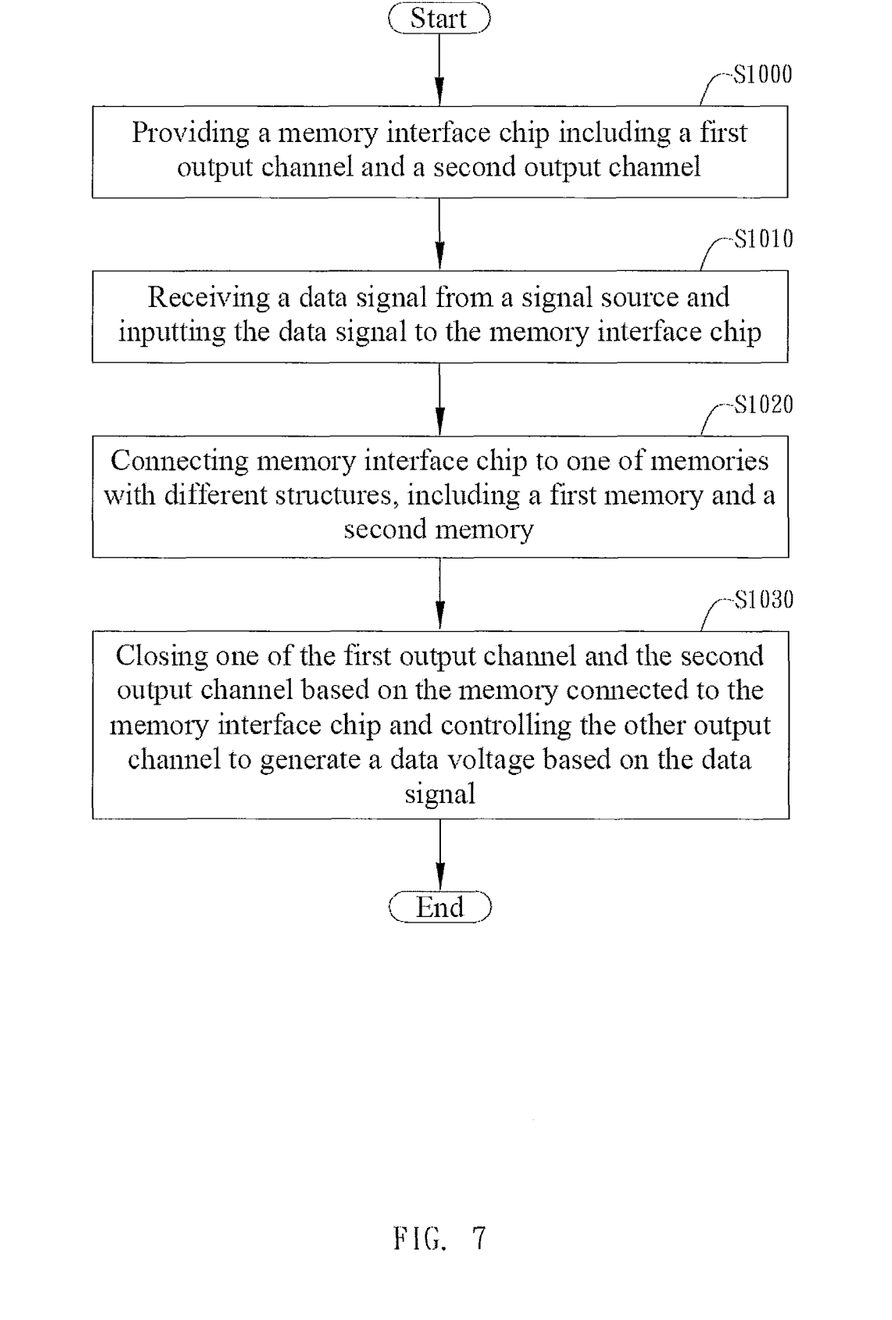
FIG. 7 is a flow chart illustrating a method of establishing data transmission channels for memories of the present invention.

FIG. 7 is a flow chart illustrating a method of establishing data transmission channels for memories. As FIG. 7 shows, the method includes step S1000 of providing a memory interface chip including a first output channel and a second output channel, wherein the first output channel and the second output channel are used to transmit digital signals with different voltages. In the present embodiment, the first output channel and the second output channel are used to transmit digital signals higher than a core voltage of 1.2 volts and lower than the core voltage of 1.2 volts, respectively, but are not limited thereto. In different embodiments, the first output channel and the second output channel can use other voltage levels as references.

The method further includes step S1010 of receiving data signals from a signal source and inputting the data signal to the memory interface chip. The signal source of the present embodiment is a CMOS image sensor, but is not limited thereto; in different embodiments, the signal source also includes charged-coupled devices or other optical electronic devices that generates analogue or digital signals based on the image sensed.

In the present embodiment, the method of establishing a data transmission channel includes step S1020 of connecting the memory interface chip to one of memories including a first memory and a second memory. The memory interface chip includes a first data bus and a second data bus to be connected to one of the first memory and the second memory and transmit signals from the signal source and the memory interface chip to one of the first memory and the second memory. In the present embodiment, the first data bus and the second data bus are 16-bit data interfaces. In other words, each of the first data bus and the second data bus has 16 pins.

The purpose of the first data bus and the second data bus mentioned above changes according to the structure of the memory connected to the memory interface chip. When the memory is a DDR SDRAM, the first data bus and the second data bus are both used to receive digital data from the memory. However, when the memory is a DDR2 SDRAM, the first data bus and the second data bus are used to transmit digital data and memory address, respectively.

Furthermore, the method of establishing data transmission channels for memories includes step S1030 of closing off one of the first output channel and the second output channel based on the memory connected to the memory interface chip and controlling the other output channel to generate a data voltage based on the data signal received from the signal source.

When the memory interface chip is connected to the first memory, the memory interface chip forces a second pre-driver of the second output channel into a high output impedance state and conducts a channel switch of the first output channel for transmission purposes. On the other hand, when the memory interface chip is connected to the second memory, the memory interface chip forces the first pre-driver of the first output channel into a high output impedance state and conducts a channel switch of the second output channel for transmission purposes.

Furthermore, in the embodiment illustrated in FIG. 7, the memory interface chip includes a first driver and a second driver used as software to drive different memories. In the present embodiment, when the interface voltage generated by the memory is greater than the core voltage of 1.2 volts, the memory interface chip uses the first driver to control the first output channel to process electrical signals greater than the core voltage of 1.2 volts. On the other hand, when the interface voltage generated by the memory is lower than the core voltage of 1.2 volts, the memory interface chip will use the second driver to control the second output channel to process electrical signals lower than 1.2 volts.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A memory interface chip for connecting to a signal source and receiving a data signal, the memory interface chip corresponding to a first memory having a first memory structure or a second memory having a second memory structure, the memory interface chip comprising:
   a data output unit, only connected to one of the first memory and the second memory and correspondingly having only a data path, the data output unit including:
      a first output channel for receiving the data signal and generating a first output signal based on the data signal; and
      a second output channel for receiving the data signal and generating a second output signal based on the data signal; and
   a control module, connected to the data output unit, wherein the control module closes off the second output channel and the data path is between the first output channel and the first memory when the data output unit is connected to the first memory, and wherein the control module closes off the first output channel and the data path is between the second output channel and the second memory when the data output unit is connected to the second memory,
   wherein the data output unit further includes a post-driver connected to the first output channel, the second output channel, and the first/second memory, the post-driver receives the first output signal from the first output channel or the second output signal from the second output channel and then transmits the signal received to the memory connected to the data output unit, and the first output channel includes:
      a level shifter for receiving the data signal and adjusting the data signal from a first level to a second level; and
      a first pre-driver, connected to the post-driver, for receiving the data signal from the level shifter and outputting the first output signal based on the data signal;
   the second output channel includes:
      a second pre-driver for receiving the data signal and generating the second output signal based on the data signal; and
      a channel switch connected to the second pre-driver to receive the second output signal from the second pre-driver and then transmit the second output signal to the memory connected to the data output unit, and
   wherein when the data output unit receives a first interface voltage corresponding to a first memory type from the memory connected to the data output unit, the control module identifies that the memory is the first memory type and forces the second pre-driver into a high output impedance state based on the first memory type; when the data output unit receives a second interface voltage corresponding to a second memory type from the memory connected to the data output unit, the control module identifies that the memory is the second memory type and forces the first pre-driver into the high output impedance state based on the second memory type, the control module disables the second pre-driver using thin-oxide layer transistors and the channel switch of the second output channel to prevent the second pre-driver and the channel switch of the second output channel from being damaged by an overstress produced by voltages higher than a core voltage of 1.2 volts to maintain a normal operation of the memory interface chip.

2. The memory interface chip of claim 1, further comprising a data receiving unit for receiving the data signal from the first memory or the second memory, wherein the data receiving unit includes a first receiving channel and a second receiving channel, and wherein the control module closes off the second receiving channel when the data output unit is connected to the first memory or the control module closes off the first receiving channel when the data output unit is connected to the second memory.

3. The memory interface chip of claim 2, wherein the first receiving channel includes a first switch for controlling a conduction of the first receiving channel and the second receiving channel includes a second switch for controlling a conduction of the second receiving channel, and wherein the control module closes off the second switch when the data output unit is connected to the first memory or closes off the first switch when the data output unit is connected to the second memory.

4. The memory interface chip of claim 1, wherein the first memory and the second memory respectively includes a first interface voltage and a second interface voltage, the data output unit receives a first interface voltage from the first memory or a second interface voltage from the second memory, and wherein the control module selectively closes off one of the first output channel and the second output channel based on whether the first interface voltage or the second interface voltage from the data output unit is received.

5. The memory interface chip of claim 1, further including a first bus and a second bus both connected to one of the first memory and the second memory, wherein when the first bus and the second bus are connected to the first memory, the first bus and the second bus are used to transmit data and a memory address respectively, and when the first bus and the second bus are connected to the second memory, the first bus and the second bus are both used to transmit data.

6. The memory interface chip of claim 1, wherein the control module includes:
   a first driver for driving the first memory; and
   a second driver for driving the second memory;
   wherein the control module uses the first driver to drive the first memory when the data output unit is connected to the first memory, the control module uses the second driver to drive the second memory when the data output unit is connected to the second memory.

7. The memory interface chip of claim 6, wherein a data transmission rate of the first memory is greater than a data transmission rate of the second memory, and an operating frequency of the first memory is greater than an operating frequency of the second memory.

8. A method of establishing a data transmission channel for memories, comprising the following steps:
   a) providing a memory interface chip including a data output unit having a first output channel and a second output channel, wherein the memory interface chip corresponds to a first memory having a first memory structure or a second memory having a second memory structure, and the data output unit is only connected to one of the first memory and the second memory and correspondingly has only a data path;
   b) receiving a data signal from a signal source and inputting the data signal to the memory interface chip;
   c) connecting the memory interface chip to one of the first memory and the second memory, wherein the first memory and the second memory correspond to the first output channel and the second output channel, respectively; and
   d) closing off one of the first output channel and the second output channel based on the memory connected to the memory interface chip and controlling the other output channel to generate a data voltage based on the data signal, wherein when the data output unit is connected to the first memory, the second output channel is closed off and the data path is between the first output channel and the first memory, and wherein when the data output unit is connected to the second memory, the first output channel is closed off and the data path is between the second output channel and the second memory,
   wherein the data output unit further includes a post-driver connected to the first output channel, the second output channel, and the first/second memory, the post-driver receives the first output signal from the first output channel or the second output signal from the second output channel and then transmits the signal received to the memory connected to the data output unit, and the first output channel includes:
      a level shifter for receiving the data signal and adjusting the data signal from a first level to a second level; and
      a first pre-driver, connected to the post-driver, for receiving the data signal from the level shifter and outputting the first output signal based on the data signal;
   the second output channel includes:
      a second pre-driver for receiving the data signal and generating the second output signal based on the data signal; and
      a channel switch connected to the second pre-driver to receive the second output signal from the second pre-driver and then transmit the second output signal to the memory connected to the data output unit, and
   wherein when the data output unit receives a first interface voltage corresponding to a first memory type from the memory connected to the data output unit, the control module identifies that the memory is the first memory type and forces the second pre-driver into a high output impedance state based on the first memory type; when the data output unit receives a second interface voltage corresponding to a second memory type from the memory connected to the data output unit, the control module identifies that the memory is the second memory type and forces the first pre-driver into the high output impedance state based on the second memory type, the control module disables the second pre-driver using thin-oxide layer transistors and the channel switch of the second output channel to prevent the second pre-driver and the channel switch of the second output channel from being damaged by an overstress produced by voltages higher than a core voltage of 1.2 volts to maintain a normal operation of the memory interface chip.

9. The method of claim 8, further comprising:
   e) connecting a data receiving unit of the memory interface chip to one of the first memory and the second memory;
   f) receiving the data signal from the memory connected to the data receiving unit in step e); and
   g) closing off one of a first receiving channel and a second receiving channel of the data receiving unit according to the memory connected to the data receiving unit in the step e) and controlling the other receiving channel to generate a data voltage based on the data signal, wherein the first receiving channel and the second receiving channel correspond to the first memory and the second memory respectively.

10. The method of claim 9, wherein the step e) includes:
   closing off a first switch of the first receiving channel to stop a data transmission of the first output channel when the data receiving unit is connected to the first memory; and
   closing off a second switch of the second output channel to stop a data transmission of the second output channel when the data receiving unit is connected to the second memory.

11. The method of claim 8, wherein the step c) includes connecting one of the first memory and the second memory to both a first bus and a second bus of the memory interface chip, when the first bus and the second bus are connected to the first memory, the first bus and the second bus are used to transmit data and a memory address, respectively, and when the first bus and the second bus are connected to the second memory, the first bus and the second bus are both used to transmit data.

12. The method of claim 11, further comprising choosing a first driver or a second driver according to the memory connected to the memory interface chip, to drive the memory connected to the memory interface chip.

13. The method of claim 8, further comprising selectively closing off one of the first output channel and the second output channel based on an interface voltage received by the memory interface chip from the first memory or the second memory.

14. The method of claim 8, further comprising selectively closing off one of the first output channel and the second output channel based on a data transmission rate and an operating frequency of the memory connected to the memory interface chip.

* * * * *